United States Patent Office 3,079,377
Patented Feb. 26, 1963

3,079,377
AZO DYES
Mario Francesco Sartori, Wilmington, Del., assignor to E. I. du Pont de Nemours and Company, Wilmington, Del., a corporation of Delaware
No Drawing. Filed Aug. 29, 1960, Ser. No. 52,341
3 Claims. (Cl. 260—205)

This invention relates to novel water-soluble, organic compounds which are useful as dyes for acid-modified acrylic and polyester fibers. By acrylic fiber or acid-modified acrylic fiber, throughout this specification and claims, is meant acrylic fiber having acid sites; for instance, the sulfonate modified acrylic fibers described in U.S.P. 2,837,500 and 2,837,501. By acid-modified polyester fiber, is meant polyethylene terephthalate fiber containing metal-sulfonate groups, as described more fully in British Patent No. 826,248, accepted December 31, 1959.

It is an object of this invention to provide novel cationic azo dyes useful for dyeing the aforementioned fibers, producing thereon orange dyeings of good strength, outstanding brightness and good light fastness, and which are furthermore characterized by stability of the shade over a wide range of pH variations, particularly in the region from pH 2 to pH 9. By the latter mentioned stability is meant that the shade of the dyeing on the aforementioned fibers does not change perceptibly with change of H-ion concentration in the pH range indicated. Other objects and achievements of this invention will become apparent as the description proceeds.

Now, according to this invention, the above objects are satisfactorily achieved by a group of novel azo dye compounds which may be used in the form of free base or in the form of quaternary salts, and which in free base form correspond to the general formula

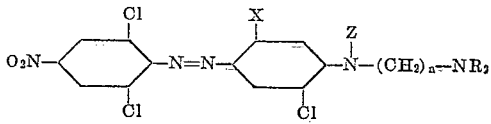

In this formula, X represents hydrogen or chlorine; R is an alkyl radical of 1 to 4 C-atoms; Z may be hydrogen or an alkyl radical of 1 to 4 C-atoms; and $n$ represents an integer from 2 to 4, inclusive.

The corresponding quaternary compounds have the same general formula except that the amine radical $NR_2$ on the extreme right is replaced by the quaternary radical

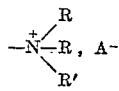

wherein the R's are alkyl radicals of 1 to 4 C-atoms, R' is alkyl (1 to 4 C-atoms) or aralkyl (e.g. benzyl), while $A^-$ is a water-soluble anionic radical such as the chloride, bromide, methosulfate or p-toluenesulfonate ion.

The novel compounds of this invention may be prepared by procedure which is per se well known, that is, by diazotizing 2,6-dichloro-4-nitroaniline, coupling in acid solution to the chosen coupling component base or to a quaternary salt thereof, and salting out the product.

The requisite coupling component base may be prepared likewise by per se known procedure. Thus, the coupling component used in Example 1 below may be prepared by reacting o-chloroaniline, 2-diethylaminoethanol and $P_2O_5$ according to the procedure of German Patent 602,049, followed by neutralization of the acid salt of the amine by addition of alkali. The product thus produced is the free base, and may be named o-chloro-N-(2-diethylaminoethyl)aniline.

To produce quaternary derivatives thereof (as for instance those used as coupling components in Example 2 below), this compound is subjected to quaternization in known manner, using customary alkylating agents such as dimethyl sulfate, a lower alkyl chloride, bromide or iodide, benzyl chloride or methyl-p-toluenesulfonate. The anion $A^-$ in the quaternary compound may be the one introduced by the alkylating agent or one introduced in the salting out or washing step.

Without limiting this invention, the following examples are given to illustrate the preferred mode of operation. Parts mentioned are by weight.

EXAMPLE 1

14.0 parts (0.2 mol) of finely ground and dry sodium nitrite are added to 200 parts of 98% sulfuric acid, while stirring and keeping the temperature at 25° to 30° C. The mixture is stirred at 30° to 40° C. until a clear solution is obtained. Powdered 2,6-dichloro-4-nitroaniline (41.2 parts) is then added, over a period of 2 hours at 25° C., and the solution is stirred for an additional hour at 30° C. The mass is then poured slowly into 800 parts of ice, while stirring and keeping the temperature at 2° to 3° C. It is then filtered, and the filtrate is added slowly to a mixture of 46 parts of o-chloro-N-(2-diethylaminoethyl)aniline in 100 parts of water and 20 parts of 37% hydrochloric acid, while stirring and keeping the temperature at 0° to 2° C. Sodium hydroxide (30% aqueous solution) is then added slowly, while keeping the temperature of the reaction mass below 5° C., to reduce the pH to 4–5. The mixture is stirred at 5° to 10° C. for 2 hours, then at room temperature for 10 hours. The precipitated dye is filtered off, washed with 10% sodium chloride solution and dried. The dye thus recovered has the formula

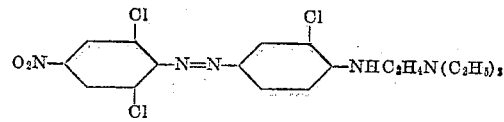

It is an orange powder, soluble in water giving an orange solution. The absorption maximum in methanol is located at 390 millimicrons. It dyes acid-modified polyester and acrylic fibers orange shades of good fastness and dyeing properties.

When the coupling component of this example is replaced by equivalent amounts of the coupling components shown in the following table, dyes of similar shade and properties are obtained:

(a) o-Chloro-N-(3-diethylaminopropyl)-N-methylaniline
(b) o-Chloro-N-(4-diethylaminobutyl)-N-methylaniline
(c) 2,5-dichloro-N-(3-diethylaminopropyl) - N - ethylaniline
(d) o-Chloro-N-(2-diethylaminoethyl)-N-methylaniline
(e) o-Chloro-N-(2-dimethylaminoethyl)-N-methylaniline
(f) o-Chloro-N-(2-dimethylaminoethyl)-N-butylaniline
(g) o-Chloro-N-(2-dibutylaminoethyl)-N-methylaniline

EXAMPLE 2

A diazotized solution of 10.3 parts of 2,6-dichloro-4-nitroaniline, prepared as described in Example 1, is added during about one half hour to a stirred solution of 18 parts of [2-(o-chloroanilino)-ethyl]diethylmethylammonium methosulfate in 20 parts of water, while keeping the temperature at 2° to 3° C. The formed dye, isolated as described in Example 1, has the formula

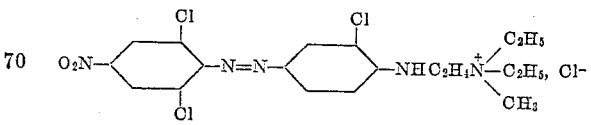

(The chloride ion appears to have been introduced during the recovery procedure, as the product was washed with 10% NaCl solution.)

It dyes acid-modified polyester and acrylic fibers orange shades of good fastness properties.

The absorption maximum in methanol is located at 390 millimicrons. When the coupling components of this example is replaced by an equivalent amount of any of the coupling components shown in the following table, dyes of similar shade and properties are obtained:

(a) [2-(o-chloroanilino)ethyl]triethylammonium methosulfate
(b) [2-(N-butyl-o-chloroanilino)ethyl]diethylmethylammonium methosulfate
(c) [2-(2,5-dichloroanilino)ethyl]diethylmethylammonium methosulfate
(d) [4-(o-chloroanilino)butyl]diethylmethylammonium methosulfate
(e) Butyldimethyl[2-(N-propyl-2,5-dichloroanilino)-ethyl]ammonium chloride The following examples will illustrate two practical dyeing procedures for use with the novel compounds of this invention:

EXAMPLE 3

*Dyeing Procedure (Acid-modified Acrylic Fiber)*

100 parts of acid-modified acrylic fiber are prescoured at 160° F. for 15 minutes in 4000 parts of water and 1 part of a non-ionic dispersing agent (for instance, the condensation product of oleyl alcohol with 20 moles of ethylene oxide). The fabric is rinsed and then boiled for 2 hours in a dyebath consisting of 1 part of glacial acetic, 1 part of the dye produced in Example 1, 0.3 part of sodium acetate and 4000 parts of water. The fabric is then rinsed in warm water and scoured as before. Finally, the fabric is rinsed, dried and pressed.

When the cationic dye of Example 2 is used in this dyeing procedure as similar orange dyeing is obtained.

EXAMPLE 4

*Dyeing Procedure (Acid-modified Polyester Fiber)*

A dyebath is prepared by mixing:

| | Parts |
|---|---|
| Dye of Example 2 | 0.1 |
| The condensation product of 20 moles of ethylene oxide with one mole of oleyl alcohol (non-ionic surfactant) | 1.2 |
| Dimethylterephthalate | 0.8 |
| Benzanilide | 0.8 |
| Water to make a total of | 4000 |

100 parts of a fabric consisting of acid-modified polyester fiber are entered into the dyebath and the bath temperature is raised to 212° F. and maintained for 2 hours. At the end of this time the cloth is removed, rinsed in water, and scoured for 15 minutes at 200° F. with 0.3 part of the sodium salt of the sulfate of the condensation product of ethylene oxide and oleyl alcohol dissolved in 4000 parts of water, removed from the scour bath, rinsed in water, and dried.

It will be understood that the details of the above examples (both synthesis and application), may be varied widely within the skill of those engaged in this art. Thus, in the procedure of Example 4, the pH of the dyebath may be reduced to 3 by adding sulfuric acid. Also, in lieu of the cationic dyes of Example 2, the basic dyes of Example 1 may be applied by the procedure of Example 4 to acid-modified polyester fiber, producing thereon fast orange shades.

In Example 2, the water-solubilizing anion for the ammonium salts of the couplers may be chloride, bromide, alkyl sulfate, p-toluene-sulfonate, etc. The anion associated with the cationic dye plays no important role in the dyeing process. Any anion therefore may be used as long as it does not render the cationic dye insoluble in the dyebath. The quaternized ammonium salts of this invention all have good affinity for the fibers specified and dye them in desirable orange shades. All of these compounds exhibit excellent light fastness, sublimation fastness, wash fastness and pH shade stability.

I claim as my invention:

1. An azo dye selected from the group consisting of the free base form and quaternary salts of compounds which in free base form correspond to the formula

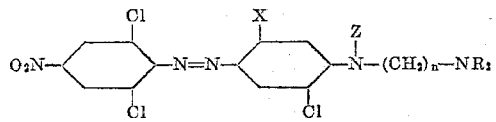

wherein X is a member of the group consisting of hydrogen and chlorine, R is an alkyl radical of 1 to 4 C-atoms, Z is a member of the group consisting of hydrogen and alkyl radicals of 1 to 4 C-atoms, while $n$ is an integer from 2 to 4.

2. The azo dye of formula

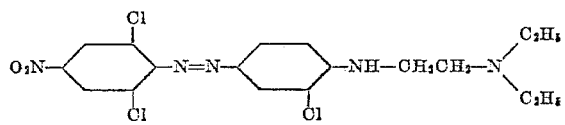

3. The azo dye of formula

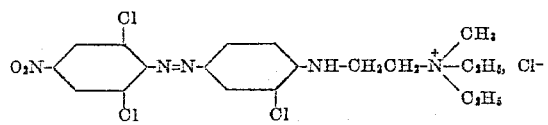

References Cited in the file of this patent

UNITED STATES PATENTS

| | | |
|---|---|---|
| 2,099,525 | Krzikalla et al. | Nov. 16, 1937 |
| 2,238,485 | Dickey et al. | Apr. 15, 1941 |